United States Patent Office 2,783,366
Patented Feb. 26, 1957

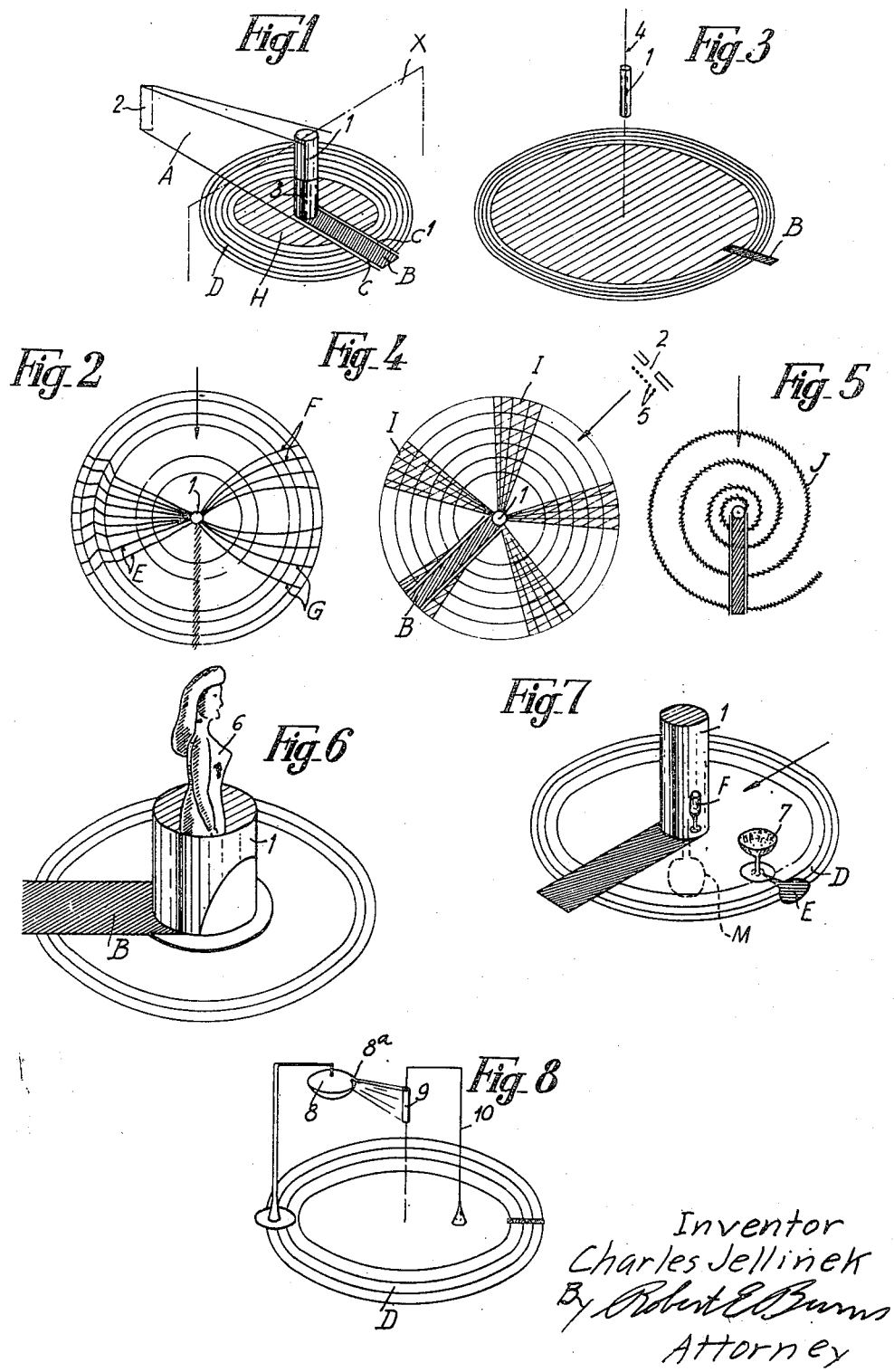

2,783,366

METHOD AND APPARATUS FOR PRODUCING ESTHETIC LIGHTING EFFECTS

Charles Jellinek, Sevran, France; Yvonne Bruyneel, Paris, and Marianne Veit, Sevran, France, the sole heirs of Charles Jellinek, deceased, assignors of one-half to Robert E. Burns, New York, N. Y.

Application January 6, 1951, Serial No. 204,804

Claims priority, application France January 13, 1950

20 Claims. (Cl. 240—10.1)

The invention relates to a method of and installation for indirect lighting, which is adapted for many uses, more particularly in the field of publicity, music-hall entertainments, the recording of photographic and cinematographic pictures, the display of articles for public exhibition, public lighting or the lighting of buildings, industrial control purposes in the polishing of surfaces, and other uses.

It resides in the discovery of an unexpected optical effect bringing about the appearance on a screen of concentric reflections or of geometrical figures of a very beautiful aesthetic effect with the aid of extremely simple means.

The present invention has for its object to provide an improved process for indirect lighting making use of this new optical effect for publicity purposes, entertainments, lighting purposes, industrial controls and the like. A further object is to provide a system for carrying out said process.

The invention will be more clearly understood with reference to the accompanying drawings, which illustrate by way of example various embodiments of the invention, and in which Fig. 1 is a diagrammatical perspective view of the invention.

Fig. 2 is a plan of another embodiment of the invention.

Fig. 3 is a perspective view of a further embodiment.

Figs. 4 and 5 are plans of other embodiments.

Figs. 6, 7 and 8 are perspective views of still other embodiments of the invention.

In order to simplify the drawings, the light source has been omitted from some of the figures.

The method according to the invention consists essentially in disposing within a dark chamber or elsewhere where there prevails a darkness or semi-darkness sufficient to bring into evidence the optical phenomena described hereinafter, a reflective object 1 (Fig. 1) of generally cylindrical shape and having a directrix of circular, oval or any other suitable curvilinear form, or of pseudo-cylindrical form, i. e., having generatrices which are non-rectilinear but preferably comprise rectilinear segments, the said object 1 having a reflective surface, and in projecting on to this object an intense beam of light consisting of parallel or substantially parallel rays A, stepped down by a diaphragm 2, the dimensions of which are such that the said object 1 is bathed in its entire width in the beam of light, the thickness of the latter being equal to or barely greater than the width of the apparent contour of the object 1 seen from the diaphragm 2. The light rays are inclined downwardly toward the surface, for example of a table, on which the object 1 is resting. As to be expected, this method of lighting the object 1 produces on the surface a shadow B and possibly two strips of light C, C₁ along the edge of the cast shadow, representing the trails of the non-hidden portions of the incident beam of light A on the table, as well as the reflection D representing the disposal of the light reflected on the table by the object 1.

Now it will be found against expectation that the reflection D is formed, for example in the case of a cylindrical object, by a disc having its centre on the geometrical axis of the cylindrical object and completely surrounding the base of the object, except in the zone of the cast shadow B and the trails of direct lighting C, C₁, this disc being brightly and practically uniformly lighted on all azimuths extending from the base of the object, including the regions situated to the rear of a diametrical plane X perpendicular to the general direction of the incident light.

The diameter of this disc in respect of a cylinder of a few centimetres in height and a suitable incidence of the beam of light is of the order of one metre.

By "uniform" lighting is understood a lighting which is of practically the same intensity as regards each azimuth, but is not necessarily uniform all along these azimuths thereof. In other words, according to the nature and the polish of the surface, the disc may appear either as a field of light of substantially homogeneous brilliance, or as a series of concentric halos or rings, which are alternately brilliant and dark, but which in each case have a substantially constant brilliance over their entire circumferential length.

For example, if the object 1 possesses a highly polished metallic surface, there is obtained a disc of light of practically uniform brilliance. If it consists of glass and possesses by reason of this fact irregularities of the surface produced by blowing or moulding, there are obtained alternate dark and sombre circles similar to the rings of Saturn.

In each case the optical effect is aesthetically very pleasing, and this effect would not appear to be readily obtainable with the usual lighting means.

An explanation for the phenomenon is not immediately apparent on the basis of the usual optical theories calling on the laws of reflection, the form of the caustic surfaces or curves or the phenomena of diffusion, diffraction or interference. The particular character of this optical effect is placed in evidence by the following tests (Fig. 2).

If the object 1 is constituted by a solid rod of colourless drawn glass, for example a laboratory glass stirring rod, there are superposed on the concentric rings radial reflections E comprising, for example, practically rectilinear radii. If the rod is composed of glass coloured in the body thereof, the rectilinear radii terminate in certain cases in zig-zag portions which are identical among themselves on all azimuths. These zig-zag portions may be attributed in the first place to irregularities in the glass (constricted zones producing, for example, variations in the refractive index). Now if the rod is reversed endwise the zig-zag portions remain identical amongst themselves and in the same location.

This result has been confirmed with a glass stirring rod coloured red. If the glass is of another colour, the radii incurvate and become spirals F (Fig. 2), which remain identical among themselves if the rod is reversed endwise, the degree of eccentricity and the direction of curvature of the spiral appearing to be specific of the selected colour. As regards certain colours, the spirals G incurvate in the opposite direction, and the direction remains the same when the rod is reversed endwise. A relationship would thus appear to exist between the colour and the direction of curvature of the spirals. The spirals F were obtained with blue-violet and those G with golden yellow.

It will be understood that the invention is independent of all scientific explanation for the phenomenon found to exist.

The effect aforesaid is brought about only if the surface of the object presented to the light is a curved surface tangential on each side to the lateral portions of the incident beam of light. If the object is prismatic or pyramidal, i. e., has flat facets, or if the incident beam of light illuminates only a part of the width of the reflective object, the above mentioned optical effect is not produced.

The object 1 may be located a certain distance from the screen on which it is proposed to obtain the desired optical effect, either by the fact that the lower portion 3 is not reflective (Fig. 1), in which case the central part H of the disc is darkened, or by the fact that the object is suspended by a wire or cord 4 a certain distance from the screen. In any case, the latter must in general be perpendicular to the geometrical axis of the object. If this is not the case, the concentric circles are replaced by series of homothetical conics, a solution which moreover is not excluded from the scope of the invention.

If the object possesses a certain conicity, the dimensions of the circles are consequently modified. If its generatrices are partly curvilinear, the concentric rings are very irregular in their thickness and their distinctness varies from one ring to another. If the object has an oblong directrix, for example oval or elliptical, the rings remain circular, but their diameter varies according to whether the diameter of the directrix perpendicular to the axis of the beam of light is the large or the small axis of the oval or ellipse.

If the object is fluted longitudinally, there are formed dark sectors I which produce a particular optical effect as shown in Fig. 4.

Depending on the fact as to whether it is transparent or translucent (glass, plastic material) or opaque (metal, glass furnished internally with an opaque material), or whether it is white, such as silver or aluminium, or black, such as a lacquered object, the appearance of the disc or ring varies accordingly.

Additional effects may be obtained by partially cutting off the incident beam of light by an opaque mask in the form of a rod or a grid comprising parallel bars. If the bars of the grid 5 (Fig. 4) are parallel to the slot of the diaphragm 2 and to the geometrical axis of the object 1, very opaque sectors are obtained as in the case of a fluted object (Fig. 4). If the assembly of bars is turned in its plane so that the bars are disposed obliquely to the slot of the diaphragm, the concentric circles D are transformed into very opaque spirals J (Fig. 5) always completely surrounding the reflective object, the eccentricity thereof diminishing in proportion to the extent to which the bars approach a direction perpendicular to the geometrical axis of the object. In this extreme position the spirals J are transformed into dark concentric rings, a result which might also be obtained by forming the surface of the reflective object of alternately disposed reflective and dull bands. By imparting to the object in Fig. 2 or Fig. 4 a rotary movement about its axis, or by according a rotary movement and/or a movement of translation to the rod or grid 5, or by bringing about these different movements simultaneously, changing optical effects are produced by rotation or deformation of the rays, spirals or darkened sectors about their axis in the desired direction and at the desired speed.

In particular, the movement of translation of the grid or rod 5 alone causes rotation of the spirals J.

The halo of light constitutes in turn a source of diffused light which completes the first effect referred to by remarkable secondary effects. If, for example, as shown in Fig. 6, there is located within the object 1, which is constituted by a hollow cylinder of sufficiently large diameter, a figurine or person 6, the latter is illuminated from below by the diffused light reflected by the screen (white surface placed on the ground, the floor of a stage or studio scene, or the like), the illumination of the figurine or person disclosing a relief effect and a softness which is extremely pleasing.

The object 1 itself constitutes a light source and at the same time also a mirror. If, as shown in Fig. 7, there is disposed within the light halo an object 7, the latter is only illuminated by the light reflected by the object 1 (not being illuminated directly by the incident light), and produces a radially cast shadow E, whilst a deformed image F is visible on the object 1, which forms a mirror. For example, a set of drinking glasses composed of cut glass distributed about the object 1 is illuminated by the latter, producing radially cast shadows superposed over the rings D, the assembly comprising the object 1, the circles of light D, the illuminated glasses 7, their shadows E and their images F forming a grouping of highly artistic effect lending itself for publicity purposes or for arrangements in the display of articles, exhibitions, fairy shows or the like, which can be rendered more attractive by the movement of screening grids, such as J, or rotation of the object 1 itself, for example by means of a drive shown schematically at M in Fig. 7.

Fig. 8 shows an adaptation to the lighting of rooms or roads, comprising a light source disposed in a lamp 8 having one or more slots 8a each transmitting a beam of light onto a reflective cylinder or other object 9 suspended above the ground by a standard or post 10 and projecting onto the ground a ring or halo of light D. Small rods having a clocklike movement imparted thereto determine the formation of rotating spirals or sectors indicating, for example, a roundabout movement.

It will be obvious that the screen on which the rings of light are caused to appear need not be horizontal, but may be, for example, vertical, the reflective object then being substantially horizontal. This object may be a visible object simulating an article held in the hand of a person (stick, cigarette holder, diadem, bracelet, ring, bottle, fire arm), or a concealed or invisible object (for example, a thin glass cylinder invisible in a darkened room so long as it is not moved in position on the path of the beam of light), rendering the effect produced more mysterious.

It is to be understood that the effect sought to be attained is accomplished only if the reflective object is struck by a single flat beam of parallel rays and only if this beam is at least as thick, but only slightly thicker than the width of the reflective object. The fineness of polish of the reflective object 1 also plays a decisive part in the brilliance and the sharpness of line of the rings or halo of light, the least unevenness causing the formation of more or less toned down shaded circular patterns.

The dimensions of the rings or halo depend on the height of the reflective object, its distance from the screen, the height about which it is lighted by the incident light, and the incidence of the latter. A small object of the size of a cigarette may in these circumstances produce a halo of several metres in diameter.

It will be appreciated that if the reflectory object is transparent and coloured, there are obtained coloured rings or halos in a non-homogeneous fashion but comprising recurring series of colour designs or different intensities of colour.

The invention may also be used for industrial control purposes in the polishing of surfaces, the object to be controlled representing the reflective object. The control may consist in comparison of the uniformly lighted halo which is obtained by means of a perfectly polished test piece with the halo comprising darkened concentric rings obtained by means of an imperfectly polished article.

The invention is, of course, not limited to the details of embodiment above referred to, which have been quoted merely by way of example.

Having now described my invention what I claim as new and desire to secure by Letters Patent is:

1. A method of indirect lighting which comprises projecting from a source of light a thin flat beam of substantially parallel rays on a reflective means having a substantially cylindrical curved reflective surface, and projecting upwardly from a flat surface, said beam being inclined downwardly toward said flat surface and the plane of said beam being substantially parallel to the longitudinal axis of said cylindrical surface, said beam being of a thickness at least equal to and not much greater than the width of the apparent outline of said reflective means as seen from said source of light, said parallel rays being reflected from said reflective means, and recovering said reflected rays on said flat surface, thereby obtaining on said surface a geometric pattern consisting of homothetic rings, halos and conical curves extending all around the geometric axis of said reflective means, except for a portion of said surface where the cast shadow of said reflective means extends.

2. A method of indirect lighting which comprises projecting from a source of light a thin flat beam of substantially parallel rays on a reflective means having a substantially cylindrical curved reflective surface, said beam being inclined downwardly toward a flat surface approximately perpendicular to the longitudinal axis of said cylindrical surface and the plane of said beam being substantially parallel to said axis, said beam being of a thickness at least equal to and in any case not much greater than the width of the apparent outline of said reflective means as seen from said source of light, said parallel rays being reflected from said reflective means, and recovering said reflected rays on said flat surface, thereby obtaining on said surface a geometric pattern consisting of homothetic rings, halos and conical curves extending all around the geometric axis of said reflective means except for a portion of said surface where the cast shadow of said reflective means extends.

3. A method of indirect lighting which comprises projecting from a source of light a thin flat beam of substantially parallel rays on a reflective means having a substantially cylindrical curved reflective surface, said beam being inclined downwardly toward a flat surface approximately perpendicular to the longitudinal axis of said cylindrical surface and the plane of said beam being substantially parallel to said axis, said beam being of a width at least equal to and in any case not much greater than the width of the apparent outline of said reflective means as seen from said source of light, interposing between said source of light and said reflective means at least one opaque bar-member intercepting only a part of said light beam, said parallel rays being reflected from said reflective means, and recovering said reflected rays on said flat surface, thereby obtaining on said surface a decorative geometric pattern.

4. A method of indirect lighting which comprises projecting from a source of light a thin, flat beam of substantially parallel rays through grid means comprising parallel opaque bars and onto a reflective means having a substantially cylindrical curved reflective surface, said beam being inclined downwardly toward a flat surface approximately perpendicular to the longitudinal axis of said cylindrical surface and the plane of said beam being substantially parallel to said axis, constricting said beam to a thickness at least equal to and in any case not much greater than the width of the apparent outline of said reflective means as seen from said source of light, said grid means intercepting only part of said light beam, said parallel rays being reflected from said reflective means, and recovering said reflected rays on said flat surface, thereby obtaining on said surface a geometric pattern consisting of dark sectors, spirals and rings according to the position of the bars of said grid means relative to said beam of light.

5. A method of indirect lighting which comprises projecting from a source of light a thin flat beam of substantially parallel rays on a reflective means having a substantially cylindrical reflective surface and projecting substantially perpendicularly from a flat surface, said beam being inclined downwardly toward said flat surface and the plane of said beam being substantially parallel to the longitudinal axis of said cylindrical surface, said beam being of a thickness at least equal to and in any case not much greater than the width of the apparent outline of said reflective means as seen from said source of light, said parallel rays being reflected from said reflective means, recovering said reflected rays on said flat surface, thereby obtaining on said surface a geometric pattern, and disposing within the area of said geometric pattern on said surface at least one object, thereby illuminating said object by said reflective means, and obtaining on said reflective means a virtual image of said object and on said surface a radially cast shadow of said object standing out from the geometric pattern.

6. A method of indirect lighting which comprises projecting from a source of light a thin flat beam of substantially parallel rays on a reflective means having a substantially cylindrical curved reflective surface, said beam being inclined downwardly toward a flat surface approximately perpendicular to the longitudinal axis of said cylindrical surface and the plane of said beam being substantially parallel to said axis, said beam being of a thickness at least equal to and in any case not much greater than the width of the apparent outline of said reflective means as seen from said source of light, said parallel rays being reflected from said reflective means, recovering said reflected rays on said flat surface, thereby obtaining on said surface a geometric pattern, disposing substantially on the geometric axis of said reflective means at least one object, and indirectly illuminating said object by light reflected from said surface.

7. A method of indirect lighting which comprises projecting from a source of light a thin flat beam of substantially parallel rays on a reflective means having a substantially cylindrical curved reflective surface, said beam being inclined downwardly toward a flat surface approximately perpendicular to the longitudinal axis of said cylindrical surface and the plane of said beam being substantially parallel to said axis, said beam being of a thickness at least equal to and in any case not much greater than the diameter of the apparent outline of said reflective means as seen from said source of light, said parallel rays being reflected from said reflective means, recovering said reflected rays on said flat surface, thereby obtaining on said surface a geometric pattern, disposing substantially on the geometric axis of said reflective means at least one person and indirectly illuminating said person by light reflected from said surface.

8. A method of indirect lighting which comprises projecting from a source of light a thin flat beam of substantially parallel rays on a reflective means having a substantially cylindrical curved reflective surface, said beam being inclined downwardly toward a flat surface approximately perpendicular to the longitudinal axis of said cylindrical surface and the plane of said beam being substantially parallel to said axis, said beam being of a thickness at least equal to and in any case not much greater than the width of the apparent outline of said reflective means as seen from said source of light, said parallel rays being reflected from said reflective means, recovering said reflected rays on said flat surface, thereby obtaining on said surface a geometric pattern, and rotating said reflective means about its longitudinal axis.

9. A method of indirect lighting which comprises projecting from a source of light a thin flat beam of substantially parallel rays on a reflective means having a substantially cylindrical curved reflective surface, said beam being inclined downwardly toward a flat surface approximately perpendicular to the longitudinal axis of said cylindrical surface and the plane of said beam being substantially parallel to said axis, said beam being of a thickness at least equal to and in any case not much greater than the width of the apparent outline of said reflective means as seen from said source of light, interposing between said source of light and said reflective means at least one opaque bar member intercepting only part of said light beam, imparting movement to said bar-member, said parallel rays being reflected from said reflective means, and recovering said reflected rays on said flat surface, thereby obtaining on said surface a geometric pattern with changing effects.

10. A method of indirect lighting which comprises projecting from a source of light a thin flat beam of substantially parallel rays on a reflective means having a substantially cylindrical curved reflective surface, said beam being inclined downwardly toward a flat surface approximately perpendicular to the longitudinal axis of said cylindrical surface and the plane of said beam being substantially parallel to said axis, said beam being of a thickness at least equal to and in any case not much greater than the width of the apparent outline of said reflective means as seen from said source of light, and rotating said reflective means about its axis, thereby obtaining on said flat surface a geometric pattern with changing effects.

11. An indirect lighting system comprising a screen, a screen, a reflective object having a substantially cylindrical curved reflective surface, said object projecting out from said screen with its longitudinal axis approximately perpendicular to said screen, a source of light projecting a beam of substantially parallel rays on said reflective object, a diaphragm disposed between said source and said reflective object, said diaphragm having an aperture shaped to define and restrict said beam to a thin, flat cross section, said beam being inclined at an angle to said screen and the plane of said beam being substantially parallel to said longitudinal axis of said reflective object, the width of said beam being at least equal to and in any case not much greater than the apparent outline of said reflective object as viewed from said light source, the light of said beam being reflected by said reflective object onto said screen to produce on said screen a geometric pattern consisting of homothetic rings and halos extending all around said reflective object except in the shadow of said reflective object.

12. A system as claimed in claim 11, wherein said reflective object is suspended over said screen.

13. A system as claimed in claim 11, wherein said reflective object is transparent.

14. A system as claimed in claim 11, wherein said reflective object is transparent and coloured.

15. A system as claimed in claim 11, wherein said reflective object is longitudinally fluted.

16. A system as claimed in claim 11, further comprising a thin bar disposed between said diaphragm and said reflective object, said bar masking selected areas of said light beam.

17. A system as claimed in claim 11, further comprising a grid comprising thin parallel bars disposed between said diaphragm and said reflective object and masking selected areas of said light beam.

18. A system as claimed in claim 11, further comprising at least one object disposed within the reflection area of said light on said screen.

19. A system as claimed in claim 11, further comprising at least one object arranged substantially on the longitudinal axis of said reflective object, said object being indirectly illuminated by light diffused by said screen.

20. A system as claimed in claim 11, further comprising means for rotating said reflective object about its longitudinal axis.

References Cited in the file of this patent

UNITED STATES PATENTS 1,871,794   Hough _____ Aug. 16, 1932

OTHER REFERENCES

"Physics," by Duff, 8th edition 1937, page 604.